United States Patent [19]

Gihl

[11] Patent Number: 5,097,470
[45] Date of Patent: Mar. 17, 1992

[54] DIAGNOSTIC SYSTEM FOR PROGRAMMABLE CONTROLLER WITH SERIAL DATA LINK

[75] Inventor: Nicholas T. Gihl, Elmhurst, Ill.

[73] Assignee: Total Control Products, Inc., Berkeley, Ill.

[21] Appl. No.: 479,165

[22] Filed: Feb. 13, 1990

[51] Int. Cl.[5] .......................... G06F 11/00; G05B 9/02
[52] U.S. Cl. ...................................... 371/62; 371/16.3; 364/184
[58] Field of Search .......................... 371/62; 331/16.3; 364/267.9, 185

[56] References Cited

U.S. PATENT DOCUMENTS

| | | | |
|---|---|---|---|
| 3,795,916 | 3/1974 | Wallace et al. | 371/62 |
| 3,919,533 | 11/1975 | Einolf, Jr. et al. | 371/62 |
| 3,997,879 | 12/1976 | Markley et al. | |
| 4,001,807 | 1/1977 | Dallimonti | |
| 4,194,349 | 3/1980 | Lane | |
| 4,247,843 | 1/1981 | Miller et al. | |
| 4,293,924 | 10/1981 | Struger et al. | |
| 4,404,651 | 9/1983 | Grudowski | |
| 4,413,319 | 11/1983 | Schultz et al. | |
| 4,554,461 | 11/1985 | Oho et al. | 371/62 |
| 4,566,111 | 1/1986 | Tanagawa | 371/62 |
| 4,667,323 | 5/1987 | Engdahl et al. | |
| 4,809,217 | 2/1989 | Floro et al. | |
| 4,851,985 | 7/1989 | Burror et al. | 371/16.5 |
| 4,860,289 | 8/1989 | Coulson | 371/62 |

FOREIGN PATENT DOCUMENTS 0050053  3/1983  Japan .................................. 371/16.3

OTHER PUBLICATIONS

IBM Tech. Disc. Bull, vol. 18, No. 1, p. 35, 6/1975.

Primary Examiner—Jerry Smith
Assistant Examiner—Henry C. Lebowitz
Attorney, Agent, or Firm—Emrich & Dithmar

[57] ABSTRACT

A diagnostic system coupled to a programmable logic controller (PLC) via a serial data link monitors the operation of apparatus under the control of the PLC. Upon detection of a first event-initiating signal, a central processor unit (CPU) in the diagnostic system initiates a timer. The CPU then awaits receipt of a second confirming action signal representing completion of the event initiated by the first signal. The timer times out after a predetermined time interval determined by an operation parameter of the controlled apparatus. If the second confirming action signal is not received before the timer times out, the CPU provides an alarm signal to a video display such as a cathode ray tube (CRT) for displaying an alarm message. The diagnostic system includes a microprocessor controlled interface circuit for receiving data on the serial data link, a random access memory (RAM) mailbox for storing operation data of the PLC and controlled apparatus, and a main central processing unit (CPU) for determining faults in the operation of the apparatus and for providing appropriate outputs to a video generator/display arrangement for providing an alarm to an operator. The diagnostic system is independent of and passive with respect to the PLC and the apparatus it controls. The diagnostic system provides real time operating data to the operator for diagnosis.

16 Claims, 4 Drawing Sheets

DIAGNOSTIC SYSTEM FOR PROGRAMMABLE CONTROLLER WITH SERIAL DATA LINK

FIELD OF THE INVENTION

This invention relates generally to programmable logic controller (PLC) operated systems and is particularly directed to an arrangement for detecting and diagnosing malfunctions in an operating system under the control of a PLC and alerting an operator to the malfunction.

PLC's are widely used in industrial equipment such as machine tools and assembly lines to sequentially operate equipment in a high speed, sequential manner in accordance with a control program stored within the PLC. Stored in a memory within the PLC, the control program is comprised of instructions which are read out of the memory in rapid succession for physically changing or moving the equipment, or portions thereof, and other instructions which energize or deenergize selected operating devices based upon the status of one or more sensing devices within the equipment.

BACKGROUND AND SUMMARY OF THE INVENTION

With the increasing complexity of machine tools and other automation equipment, it has become more difficult to diagnose problems in their operation. Machine designers have long used the event timing approach to diagnose a machine problem. This approach is based upon machine operating characteristics that include a definite starting time for each operation, and an ending event. In most such machines, each event must be performed within a fixed period of time, with this time period being constant for a given machine. This fixed time is an operating characteristic of the machine, with the machine possessing many such operating characteristics as it carries out various operations. Indeed, each operation may be characterized by a large number of fixed time periods, each having associated therewith a different period of time. Also inherent in the operation of such machines is the occurrence of a starting event, e.g., the initiation of some output, and an ending event such as a signal arising from a limit switch closure.

Because of its adaptability, the PLC has been used to diagnose problems in the operating machine. However, this is not always satisfactory for various reasons. First, this causes PLC ladder logic memory requirements to increase such that some diagnostic routines consume up to 40% of the total ladder logic memory available in the PLC. This often results in the requirement to use more expensive PLCs having larger memories. A second drawback is that PLC scan time is increased. With the machines being controlled becoming more complex and placing additional demands on the PLC, adding diagnostic logic to an already busy PLC exceeds its operating speed, again requiring an upgraded, more expensive PLC. Another problem with incorporating diagnostics in the PLC is that the diagnostic logic tends to clutter up machine control logic, making it more difficult to follow and execute. This frequently results in lengthening the time required to fix some machine problems, resulting in exactly the opposite intent of the diagnostic routine. All three of the aforementioned problems are aggravated when an attempt is made to retrofit an existing machine with a diagnostic routine, as the PLCs in older machines cannot be easily upgraded to larger and faster versions without extensive ladder logic rewrite.

In summary, the problems encountered in retrofitting a PLC-controlled machine with a diagnostic program make this alternative impractical.

Several approaches to removing the diagnostics from the PLC have been attempted. One approach employs a system that reads the machine's input/output (I/O) points as fast as the PLC itself accesses this information. This approach can be used only with a limited number of the larger and more expensive PLCs and is itself very expensive. Another approach allows the machine designer to specify to valid states of the machine. This approach is satisfactory so long as all valid machine states were correctly input. However, only one intimately familiar with this state table can work on this system, making field modifications impractical. Retrofitting of this type of system also requires a machine expert generally in the form of an expensive consultant to program the system.

The present invention overcomes the aforementioned limitations of the prior art by providing diagnostics for a PLC operated system in a manner which is completely passive and invisible to the PLC and which does not therefore place requirements on PLC memory capacity or restrict PLC operating speed. The PLC program may thus be entirely devoted to control functions and the stand alone diagnostic program is more easily maintained.

DETAILED DESCRIPTION OF THE PREFERRED EMBODIMENT

Figure 1:
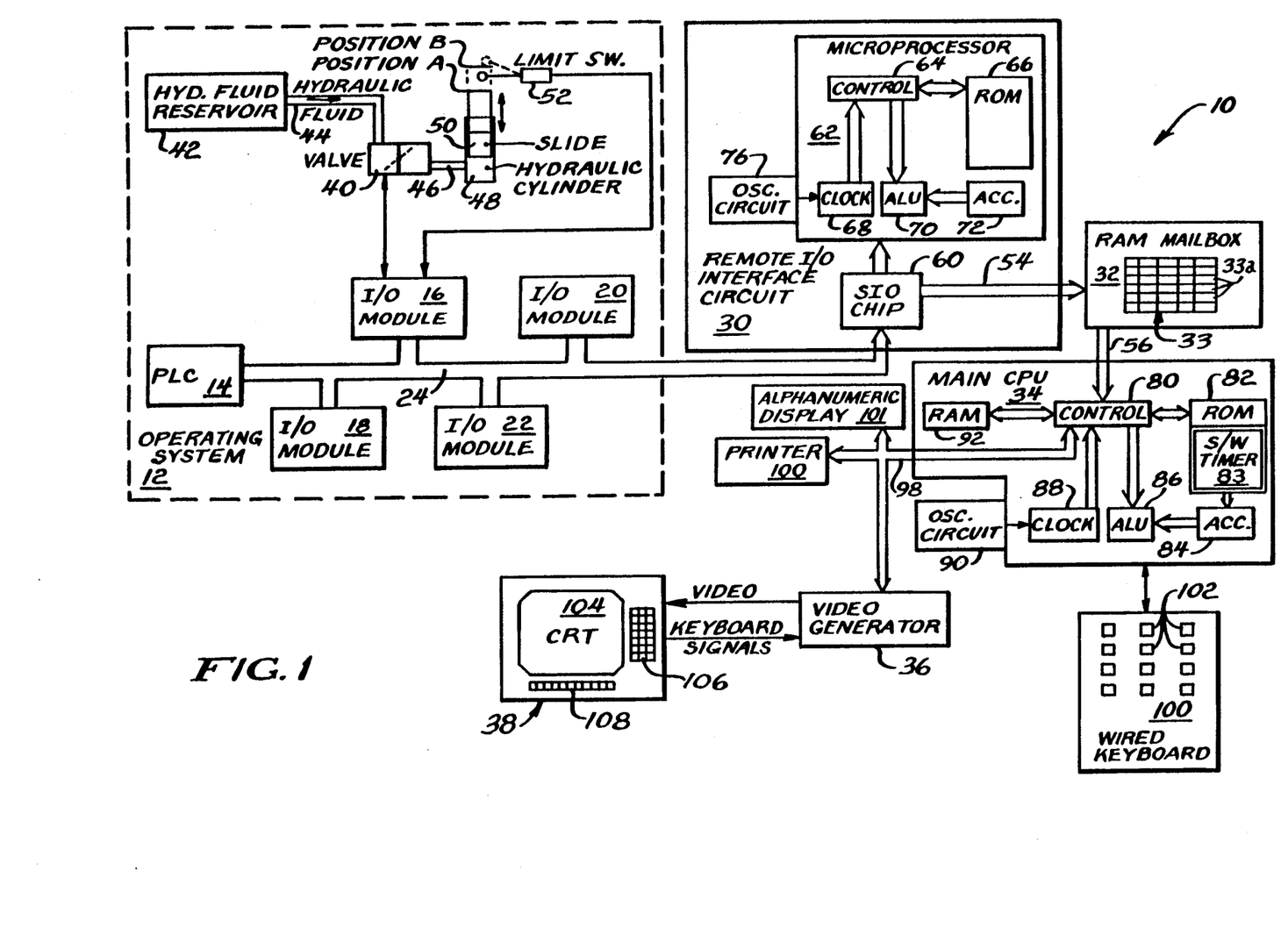
FIG. 1 is a simplified block diagram of a diagnostic system for a programmable controller with a serial data link in accordance with the principles of the present invention.

Referring to FIG. 1, there is shown a simplified schematic and block diagram of a diagnostic system 10 in accordance with the present invention for use with an operating system 12 under the control of a programmable logic controller (PLC). The operating system 12 includes a plurality of input/output (I/O) modules 16, 18, 20 and 22, each including a machine for performing work. The diagnostic system 10 of the present invention is adapted for use with any operating system which operates on the principal that for any action, there is a corresponding reaction. In this type of system, an action is begun with an initiating event, followed by a detectable reaction which confirms the occurrence of the action. One example of such a machine is a hydraulic cylinder with an extendable rod, with the extended rod engaging a switch which provides a feedback signal for confirming rod extension. Another characteristic of the operating system 12 for which the diagnostic system 10 of the present invention is intended for use is that every action should occur, and be capable of confirmation, within a given time interval from initiation of the action. This time interval is a characteristic of the machine performing the operation and is generally established as a design performance criterion. These characteristics are inherent in essentially all machine operations involving displacement of a machine component or article upon which the machine does work.

The number and type of I/O modules will vary depending upon the particular application in which the operating system 12 is used. Each of the I/O modules includes one or more operating devices as well as one or more sensing devices. As shown in FIG. 1, I/O module 16 includes a hydraulic cylinder 48 for performing work. Included is a valve 40 which is coupled to the I/O module 16 for receiving an initiation signal from the PLC 14. The valve 40 is further coupled to a hydraulic fluid reservoir 42 via a first hydraulic line 44. The valve 40 is also coupled via a second hydraulic line 46 to the hydraulic cylinder 48 for linearly displacing the cylinder's slide 50 between a retracted position A and an extended position B. The PLC 14 outputs an initiation signal via the serial data link 24 to the I/O module 16 and then to the valve 40. Hydraulic fluid is delivered under pressure via the second hydraulic line 46 to the butt end of the hydraulic cylinder 48 for extending the slide 50 to position B. When the slide 50 reaches position B, a limit switch 52 is engaged and transmits a confirmation signal via the I/O module 16 and serial data link 24 to the PLC 14. The diagnostic system 10 is also coupled to the serial data link 24 and makes use of both the initiation signal and the confirmation signal as well as a predetermined time period between the occurrence of these signals which is a specified operating characteristic of the machine in diagnosing the operation of the machine. Details of the manner in which the diagnostic system 10 performs this function are provided below.

The diagnostic system 10 includes a remote I/O interface circuit 30 comprised of a serial interface output (SIO) chip 60 and a microprocessor 62. Data is received from the PLC 14 in the operating system 12 via the serial data link 24 and is processed by the microprocessor 62 for storage in a random access memory (RAM) mailbox 32 coupled to the SIO via a data bus 54.

Microprocessor 62 includes a controller 64, a read-only memory (ROM) 66, a clock 68, an arithmetic and logic unit (ALU) 70, and an accumulator 72, with the Z-80 microprocessor used in a preferred embodiment. The microprocessor 62 further includes an external oscillator circuit 76 for use as a timing reference. The SIO chip 60 converts the data from the serial data link to parallel data, while the microprocessor 62 is programmed to convert the data from the serial data link into a format useable by the RAM mailbox 32. One example of the translation of a serial data format from a PLC controlled operating system to a parallel format for diagnostic analysis can be found in U.S. Pat. No. 4,404,651. The translated data is then stored in a matrix memory 33 comprised of a large number of data storage locations 33a within the RAM mailbox 32. The remote I/O interface circuit 30 receives discrete data words from the PLC 14 in the form of initiation signals as well as from the I/O modules in the form of confirmation signals and transmits the corresponding data for storage in the RAM mailbox 32.

The remote I/O interface circuit 30 under the control of the microprocessor 62 continuously monitors the two-way data transmissions between the PLC 14 and I/O modules, decodes this data via the SIO chip 60, and builds an image of the sequence of operations of the operating system 12 for storage in the RAM mailbox 32. Each of the locations 33a in the RAM mailbox's matrix memory 33 has associated therewith either an initiation event or a confirmation event for the storage of the corresponding data thereof. The large number of storage locations 33a in the matrix memory 33 permits a large number of operations for each individual machine and a large number of machines in the operating system 12 to be monitored. The storage of data in the form of an image table representing the operation of the operating system is described in detail below.

Coupled to the RAM mailbox 32 via a data bus 56 is a main central processor unit (CPU) 34. A motorala MC 68,000 CPU is used in a preferred embodiment of the diagnostic system 10 of the present invention. The CPU 34 includes a random access memory (RAM) 92, a controller 80, a clock 88, an arithmetic and logic unit (ALU) 86, an accumulator 84, and a read-only memory (ROM) 60. The main CPU 34 stores instructions and data, periodically updates the stored data, compares both stored and real-time data and makes decisions based upon these comparisons by means of logic instructions stored in its ROM 82 in providing control over the diagnostic system 10. The ROM 82 is a programmable, nonvolatile, factory produced memory matrix which includes a plurality of memory locations or "bytes" of 8 bits each.

An external crystal oscillator circuit 90 provides timing signals to the clock 88 of the main CPU 34 for controlling the timing of operations carried out by the CPU. The CPU controller 80 is responsive to instructions read from the ROM 82 and directs the ALU 86 to perform various arithmetic operations in accordance with these instructions with respect to data stored in the CPU's RAM 92 as well as in the RAM mailbox 32 coupled to the main CPU 34. A software (S/W) timer 83 in the ROM 82 provides a time reference signal to the ALU 86 via the accumulator 84 for comparison with the timing of the initiation and confirmation data provided to and read from the RAM mailbox 32 in carrying out the diagnostic function as described below. The software timer 83 within the CPU's ROM 82 operates as a timer which times out in accordance with a predetermined response time for the particular operation and machine in the operating system 12 under diagnosis. For example, referring back to the hydraulic cylinder 48 of FIG. 1, the operation of the cylinder may be such that it should take no more than three seconds for the slide 50 to move from position A to position B. This time interval would then be stored in the CPU's RAM 92 for comparison with the actual time between receipt of these signals as measured by the ROM's S/W timer 83. Because of the large number of machines and operations which may be in the operating system 12, the RAM 92 is programmed with various response times each corresponding to a given operation of a machine. There is one response time for each operation carried out by the operating system 12. The RAM 92 in the main CPU 34 may be programmed with various response times by means of a keyboard 100 having a plurality of keys 102 which is coupled to the main CPU. Machine response times may also be programmed in the RAM 92 by means of a keyboard 106 also having a plurality of keys 106a on a video display 38 coupled to the main CPU 34 as described below.

The main CPU 34 operates in the following manner in analyzing the operation of a machine such as the hydraulic cylinder 48 in the operating system 12. A Response Time for a given operation is stored in the CPU's RAM 92. Each machine operation has associated with it a Predetermined Response Time, which represents the time for executing that operation under normal conditions. The CPU's controller 80 continuously monitors the contents of the RAM mailbox 32 looking for the occurrence of an initiation event. The controller 80 proceeds through each of the storage locations 33a in a sequential manner, and upon detection of an initiating event as represented by an Initiation Time Signal received by the RAM mailbox 32 provides an appropriate output to the CPU's ROM 82 for initiating the software timer 83. The controller 80 also writes into RAM 92 (sometimes referred to as an Initiation Time) a reference time received from the clock 88 corresponding to the absolute or real time of detection of the initiation signal. This Initiation Time is then added to the Predetermined Response Time previously stored in the RAM 92 to provide a stored time limit, in real time (sometimes referred to as an Expected Time) based upon the Predetermined Response Time for that particular operation. The controller then proceeds to the address of the next event in the RAM mailbox 32 and looks for the occurrence of an initiation event for that particular operation. This process continues through all storage locations, and associated operations, in the RAM mailbox 32. The controller 80 then again reads the contents of the RAM mailbox 32 in the aforementioned predetermined sequence looking for the occurrence of a confirmation event (that is, a signal confirming that the particular machine operation in question has been completed as executed) for each of the operations for which an associated initiation signal has been received and stored in the RAM mailbox 32. If a confirmation event is detected by the CPU controller 80, it generates a signal from software timer 83 which is representative of the absolute time at which the confirmation event signal is received. This is sometimes called the Confirmation Time for that event. The system then compares the Expected Time with the Confirmation Time and determines if the Confirmation Time exceeds the Expected Time stored in the CPU's RAM associated with that event. If the Confirmation Time does not exceed the stored Expected Time, the controller proceeds to the next storage location 33a in the RAM mailbox's matrix memory 33 and looks for a confirmation event for that operation. This sequence continues until a confirmation event is detected by the controller 80. If the Confirmation Time is determined not to have occurred before the Expected Time, the controller 80 provides an alert signal via a bi-directional data bus 98 to a video generator 36. The video generator may be conventional in design and operation and typically includes a video RAM array, various latches and logic circuitry for driving the video display 38. In a preferred embodiment, the video display 38 includes a cathode ray tube (CRT) 104 as well as a multi-key keyboard 106 and display controls 108. The display controls 108 allow for control over the video adjustment of presentation on the CRT 104, while the keyboard 106 permits a diagnostic system operator to enter various commands for controlling the diagnostic system. The keyboard signal entries are provided via the video generator 36 to the CPU's controller 80 via the bi-directional data bus 98. The video generator 36 in response to control outputs from the CPU's controller 80 provides various video control signals to the video display 38. In response to receipt of an alert signal from the CPU's controller 80, the video generator 36 provides an appropriate control input to the video display 38 for presenting a visual alarm indication on the CRT 104. Other peripherals, such as a printer 100 and an alphanumeric display 101, may be coupled to the main CPU 304 for providing another form of alarm indication to a diagnostic system operator.

Figure 2A:
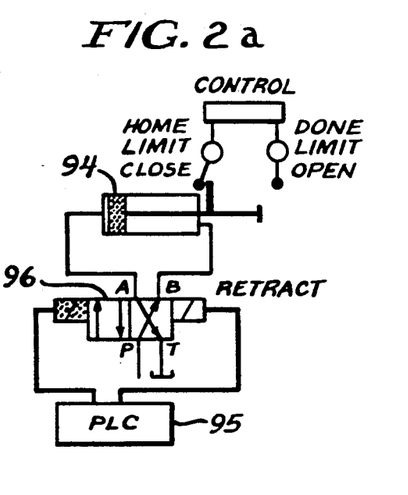
FIGS. 2a and 2b are simplified schematic illustrations of the operation of a typical sequential machine, such as a hydraulic cylinder, with which the diagnostic system of the present invention is intended for use.
Figure 2B:
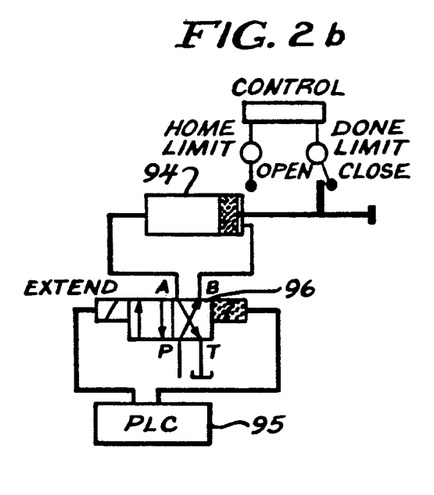

The use of the diagnostic system of the present invention in analyzing the operation of a typical machine motion will now be described in terms of a double-acting cylinder 94 shown in FIGS. 2a and 2b. The double-acting clamp cylinder 94 can move between two positions, a HOME limit closed and a DONE limit closed. An initiation signal is provided by the PLC 95 to the I/O module 96 causing a valve to move to an open position, where the valve will tend to stay until it is moved closed. With the valve open, the clamp cylinder 94 begins to move and a limit, hereinafter referred to as the HOME limit, which has been held closed by the cylinder is opened. After a predetermined time period, the cylinder 94 reaches the end of its travel and another limit, termed the DONE limit, is held closed by the cylinder. When the PLC 95 detects the close of the DONE limit upon receipt of a confirmation signal, the PLC usually de-energizes the initiating output and starts the next sequential operation.

Later in the cylinder cycle, this operation is reversed, i.e., the PLC 95 energizes an output called the complementary output causing the cylinder 94 to begin moving towards its initial home position. After the cylinder 94 begins to move, the DONE limit is no longer held closed by the cylinder, and it opens. After more time elapses, the cylinder 94 retracts far enough to hold the HOME limit closed, with the complementary output usually de-energized and the operation is complete. The following is a list of what can go wrong with a machine motion.

1) Cylinder cannot move from HOME position
2) Cylinder jams moving between HOME and DONE position
3) Cylinder cannot move from DONE position
4) Cylinder jams moving between DONE and HOME position
5) HOME limit fails open
6) HOME limit fails closed
7) DONE limit fails open
8) DONE limit fails closed
9) Valve drifts off open position, air or hydraulics leak, and cylinder drifts off of DONE position
10) Valve drifts off closed position, air or hydraulics leak, and cylinder drifts off of HOME position No diagnostic system will be able to tell whether a fault message is due to the cylinder not closing a switch or due to a switch failing, or due to a cylinder drifting off a switch. If the diagnostic system can still bring up a message such as: "Cylinder 1 HOME Limit Failed To Close!", a simple visual inspection of the cylinder 1 HOME limit will determine whether the cylinder has physically closed the limit, drifted off the limit, or never made the limit, due to a jammed condition.

Now described is an example of timing based diagnostics in accordance with the present invention which can be used in diagnosing the operation of a double-acting cylinder. This example specifically is described in terms of interfacing with the Allen-Bradley PLC-2 input and output addressing. Intially, the machine mechanical designer or operator must first determine how quickly the machine operates in terms of a predetermined operating parameter of the machine. For a complete machine motion, fully sensed, four times must be specified:

t1) Time from INITIATING OUTPUT to cylinder moves off of HOME limit
t2) Time from INITIATING OUTPUT to cylinder closes DONE limit
t3) Time from COMPLEMENTARY OUTPUT to cylinder moves off of DONE limit
t4) Time from COMPLEMENTARY OUTPUT to cylinder closes HOME limit These times are determined at the time the machine is designed and are typically well documented. Often these times are specified as design performance criteria by the machine buyer. In the present example, T1=1 second, T2=5 seconds, T3=1 second, and T4=7 seconds. The Initiating Output is at PLC address 011000 and the complementary output is at 011001. The HOME limit input it at 11002 and the DONE limit input is at 11003. Table I summarizes the data for this machine motion in the form of a chart.

TABLE 1

| Output | Input | Complimentary Output | Time | Message |
|---|---|---|---|---|
| 11000 | *11002 | 11001 | 1 | Cylinder home limit never opened! |
| 11000 | 11003 | 11001 | 5 | Cylinder did not make done limit! |

TABLE 1-continued

| Output | Input | Complimentary Output | Time | Message |
|---|---|---|---|---|
| 11001 | *11003 | 11000 | 1 | Cylinder done limit never opened! |
| 11001 | 11002 | 11000 | 7 | Cylinder did not make home limit! |

The chart shown in Table I, referred to as the Diagnostic Edit File, is stored in the main CPU's RAM 92 by either of the aforementioned keyboards 100, 106 or via the CRT 104 which may be provided with a user interactive operation capability. The Diagnostic Edit File contains all the information that was assembled into Table I and is called from a menu and placed in a form as shown in Table II

TABLE II

| DIAGNOSTIC EDIT FILE | | | | | | | PAGE NO. 00 | |
|---|---|---|---|---|---|---|---|---|
| NUM | OUTPUT | INPUT # | COMPL # | CT | F | SC | VID | DIAGNOSTIC MESSAGE |
| 000 | 11000 | *11002 | 11001 | 1 | | | | Cylinder home limit never opened! |
| 001 | 11000 | 11003 | 11001 | 5 | | | | Cylinder did not make done limit! |
| 002 | 11001 | *11003 | 11000 | 1 | | | | Cylinder done limit never opened! |
| 003 | 11001 | 11002 | 11000 | 7 | | | | Cylinder did not make home limit! |

COMP = Complimentary Output
CT = Count in Seconds

In the Diagnostic Edit File, "NUM" indicates the number of the diagnostic message, while the output and input storage locations in the main CPU's RAM are respectively designated for the first diagnostic message as 11000 and *11002, respectively. The Complementary Output is stored in location 11001 in the main CPU's RAM 92 while the column labelled "CT" designates the predetermined response time of a machine under the control of the PLC 14 for a given operation. A brief summary of each diagnostic message is provided in the right-hand column of Table II.

Under the column labelled "Diagnostic Message" in the Diagnostic Edit File, there are two lines of diagnostic text messages. In the following example, the first diagnostic message is "Cylinder HOME limit never opened!" and the second diagnostic message is "Check for jammed cylinder", as shown in Table III.

TABLE III

| | DIAGNOSTIC EDIT FILE | | | | | | PAGE NO. | 00 |
| --- | --- | --- | --- | --- | --- | --- | --- | --- |
| NUM | OUTPUT | INPUT # | COMPL # | CT | F | SC | VID | DIAGNOSTIC MESSAGE |
| 000 | 11000 | *11002 | 11001 | 1 | | | | Cylinder home limit never opened! |
| | | | | | | | | Check for jammed cylinder. |
| | | | | | | | | |

The diagnostic system of the present invention can also control dynamic conditions to indicate that an error exists. Dynamic conditions are active elements on the CRT display that change according to the value of a variable. In the present example, the dynamic condition is controlled by a variable which has the ID number 10. Line 000 shows the VID of 10. When the diagnostic program detects an error, bit 0 of ID 10 will change from a 0 to a 1, which will change the state of a dynamic condition. Therefore, the diagnostic line can control dynamic parts as well as send error messages. The change within the main CPU's RAM 92 following detection of an error by the diagnostic program is shown in Table IV.

Table" refers to the values from individual input modules in the I/O racks or modules coupled to the serial data link, while the "Output Image Table" indicates the values from output modules, such as switches, in I/O modules coupled to the serial data link. The input and output image tables are stored in the RAM mailbox 32. The "diagnostic table" is a table in the CPU's RAM 92 in which are stored initiating and confirming events as well as times and fault messages. The "start timer flag" is that bit which indicates the status of the countdown timer, where a "1" indicates that the countdown timer is operating, and a "0" indicates that the countdown timer has not yet started. The "fault flag" is a bit in a data word which indicates the status of a fault. A "1" indi-

TABLE IV

| | DIAGNOSTIC EDIT FILE | | | | | | PAGE NO. | 00 |
| --- | --- | --- | --- | --- | --- | --- | --- | --- |
| NUM | OUTPUT | INPUT # | COMPL # | CT | F | SC | VID | DIAGNOSTIC MESSAGE |
| 000 | 11000 | *11002 | 11001 | 1 | | | 10 | Cylinder home limit never opened! |
| | | | | | | | | |
| | | | | | | | | |

Figure 3A:
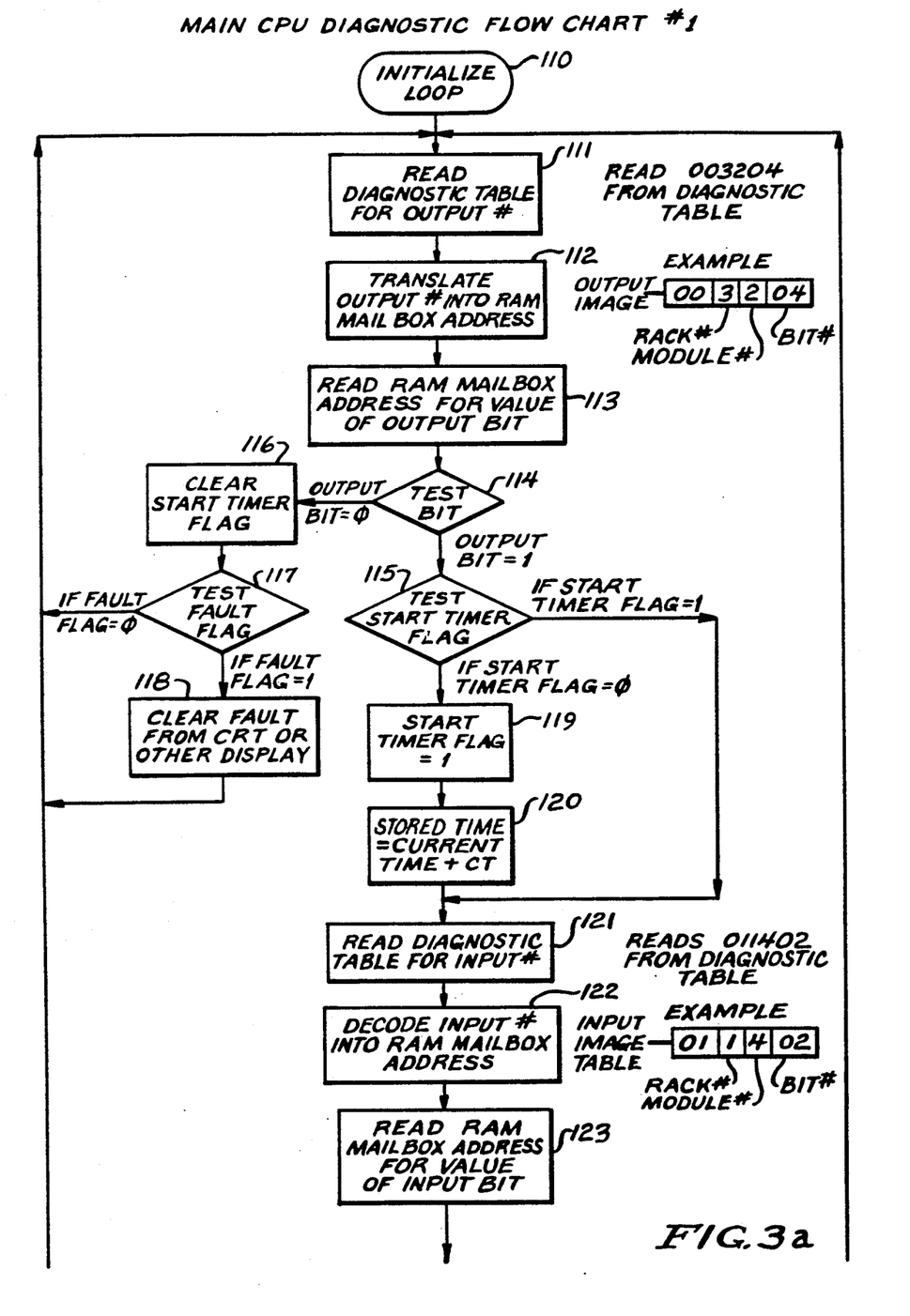
FIGS. 3a and 3b are a flow chart illustrating the sequence of operations carried out by the diagnostic system of the present invention in diagnosing problems of a machine operated by a programmable controller.
Figure 3B:
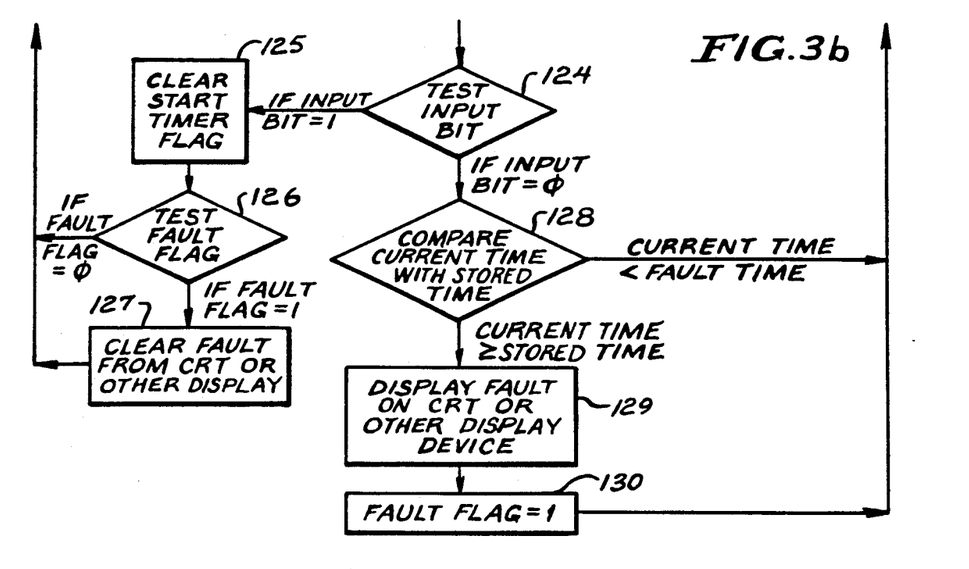

Referring to FIGS. 3a and 3b, there is shown a flow diagram illustrating operations carried out in the diagnostic system 10 of the present invention under the control of its main CPU 34. In FIGS. 3a and 3b, an oval symbol indicates the start of an operational sequence, a rectangle indicates an instruction or set of instructions resulting in the performance of a control function, and a diamond indicates a decision based upon the comparison of binary signals within the main CPU 34. The following description of the operations carried out by the main CPU 34 also refers to FIG. 4, which is a simplified block diagram of a portion of the diagnostic system of the present invention illustrating additional details of the interaction between a pair of I/O modules 26 and 28, the remote I/O interface circuit 30, the RAM mailbox 32, and the main CPU 34. Reference is also made in the following paragraphs to Table V which shows the locations in the RAM mailbox 32 in which various data used in carrying out the present invention is stored. The particulars of the system given in the following paragraphs are provided merely for the purpose of describing one embodiment of the diagnostic system and should not be considered as limitations of the present invention.

In describing the operations carried out in the flow chart of FIGS. 3a and 3b, various terms are used having definitions as indicated below. The term "Input Image cates that a fault is currently active on the video display, while a "0" indicates that a fault is not currently being displayed. "Current time" indicates the present real time to the nearest 1/100 of a second. The "stored time" is the time at which if a confirmation signal has not been received, a fault has occurred. The stored time is defined as the sum of the current time when an initiating event occurs plus the "CT" value stored in the diagnostic table of the CPU's RAM, where CT equals the response time of a machine for a given operation.

At step 110, the operation of the program stored in the main CPU's ROM 82 for diagnosing the operation of a machine is initiated. As a result, the main CPU 34 is initialized by resetting its control flags to an initial set of conditions whereupon the main CPU is ready for controlling the diagnostic system 10 in accordance with the present invention. At step 111, the program stored in the main CPU reads the contents of the RAM mailbox shown in Table V for an output number. Thus, the main CPU controller 80 reads the contents of location 03204 in the CPU's RAM 92. This CPU RAM address is then decoded at step 112 into a corresponding RAM mailbox address. The first two "00" bits indicate that the output image portion of the RAM mailbox corresponding to the storage of an initiation signal is to be addressed.

TABLE V

| NUMBER | OUTPUT | INPUT | COMP # | CT | MESSAGE |
| --- | --- | --- | --- | --- | --- |
| 000 | 003204 | 011402 | 003205 | 06 1 04 110 | SLIDE 11A DID NOT EXTEND |
| | | | 000000 | | 11A-1LSA 11402 PV46A 03204 |
| | | | 000000 | | |

TABLE V-continued

| NUMBER | OUTPUT | INPUT | COMP # | CT | MESSAGE |
|---|---|---|---|---|---|
| 001 | 003205 | 070403 | 003204<br>000000<br>000000 | 06 1 04 110 | SLIDE 11A DID NOT RETURN<br>11A-1LSB 11403 PV46B 03205 |
| 002 | 003206 | 070404 | 003207<br>000000<br>000000 | 06 1 04 110 | SLIDE 11B DID NOT EXTEND<br>11B-1LS 11404 PV47A 03206 |
| 003 | 003207 | 070405 | 003206<br>000000<br>000000 | 06 1 04 110 | SLIDE 11B DID NOT RETURN<br>11B-2LS 11405 PV47B 03207 |
| 004 | 003213 | 070504 | 003212<br>000000<br>000000 | 06 1 04 130 | INDEX 13C DID NOT RETURN<br>13C-1LS 11504 PV49B 03213 |
| 005 | 003212 | 070505 | 003213<br>000000<br>000000 | 06 1 04 130 | INDEX 13C DID NOT EXTEND<br>13C-2LS 11505 PV49A 03212 |
| 006 | 003215 | 070500 | 003214<br>000000<br>000000 | 06 1 04 130 | SLIDE 13A DID NOT RETURN<br>13A-1LS 11500 PV50B 03215 |
| 007 | 003214 | 070501 | 003215<br>000000<br>000000 | 06 1 04 130 | SLIDE 13A DID NOT EXTEND<br>13A-2LS 11501 PV50A 03214 |
| 008 | 073700 | 071116 | 000000<br>000000<br>000000 | 06 1 04 131 | UNIT 13 W/G 13WG1 & WG2 DID NOT EXTEND<br>13PS-1 12116 PV19 02700 |
| 009 | *073612 | 070406 | 000000<br>000000<br>000000 | 06 1 04 115 | UNIT 11 WELD GUN 11WG1 DID NOT OPEN<br>11WG1-1LS 11406 *PV13 *02612 |
| 010 | 073612 | 071110 | 000000<br>000000<br>000000 | 06 1 04 111 | UNIT 11 W/G 11WG1 & DG1 DID NOT EXTEND<br>11PS-1 12110 PV13 02612 |
| 011 | *073613 | 070407 | 000000<br>000000<br>000000 | 06 1 04 116 | UNIT 11 WELD GUN 11WG2 DID NOT OPEN<br>11WG2-1LS 11407 *PV14 *02613 |
| 012 | 073613 | 071111 | 000000<br>000000<br>000000 | 06 1 04 112 | UNIT 11 WELD GUN 11WG2 DID NOT EXTEND<br>11PS-2 12111 PV14 02613 |
| 013 | *073614 | 070410 | 000000<br>000000<br>000000 | 06 1 04 117 | UNIT 11 WELD GUN 11WG3 DID NOT OPEN<br>11WG3-1LS 11410 *PV15 *02614 |
| 014 | 073614 | 071112 | 000000<br>000000<br>000000 | 06 1 04 113 | UNIT 11 WELD GUN 11WG3 DID NOT EXTEND<br>11PS-3 12112 PV15 02614 |
| 015 | 073615 | 071113 | 000000<br>000000<br>000000 | 06 1 04 114 | UNIT 11 WELD GUN 11DG2 DID NOT EXTEND<br>11PS-4 12113 PV16 02615 |
| 016 | 073715 | 070206 | 073714<br>000000<br>000000 | 06 1 05 430 | P/P DUMP 4C DID NOT RETURN<br>4C-1XS *11206 PV26B 02715 |
| 017 | 073714 | 070207 | 073715<br>000000<br>000000 | 06 1 05 430 | P/P DUMP 4C DID NOT EXTEND<br>4C-2XS *11207 PV26A 02714 |
| 018 | 073710 | 071210 | 073711<br>000000<br>000000 | 12 1 06 022 | UNIT 22 UNLOADER DID NOT EXTEND<br>22A-1LS 12210 PV23A 02710 |
| 019 | 073711 | 071211 | 073710 | 12 1 06 022 | UNIT 22 UNLOADER DID NOT RETURN |

The third bit indicates the rack number in a particular I/O module, while the fourth bit indicates the module number of the output image data to be stored in the RAM mailbox. The last two bits indicate the bit number which is to be accessed in a given address location of the RAM mailbox.

After the CPU RAM address is decoded into a corresponing RAM mailbox address, the data from the accessed RAM mailbox address is read from the RAM mailbox by the main CPU at step 113 and a test is performed at step 114 to determine the status of the output bit of the data word read from the RAM mailbox. The status of the output bit indicates whether or not an initiation signal has been read into and stored in the RAM mailbox 32. If at step 114, it is determined that the test bit is 0 indicating that an initiation signal has not been stored in the RAM mailbox, the program branches to step 116 and clears the start timer flag for resetting the countdown timer in the main CPU. The program then performs a fault test at step 117 in order to determine if a fault flag has been set. If it is determined that a fault flag has not been set, or that this bit is 0, the program loops back up to its initial operation in reading an output number from the diagnostic table at step 111. If at step 117, it is determined that the fault flag has been set, or that this bit is 1, the program clears the fault from the CRT or other display medium and returns to step 111 and the reading of the diagnostic table stored in the CPU's RAM.

If at step 114 it is determined that the output bit is 1 indicating that an initiation signal has been stored in the RAM mailbox, the program proceeds to step 115 and executes a test of the start timer flag. If the start timer flag bit is 1, the program branches down to step 121 and reads an input number from the diagnostic table stored in the CPU's RAM 92. If at step 115 it is determined that the start timer flag bit is 0, the program branches to step 119 and sets the start timer flag bit to 1. The program then determines the stored time which by definition is the time of occurrence of an initiation signal plus the value CT stored in the diagnostic table of the CPU's RAM. As indicated above, CT is an operating parameter characteristic of a given operation for a particular machine under diagnosis, i.e., a predetermined response time. The program then reads the first input data location in the diagnostic table of the CPU's RAM. In the present example, this address is 011402. At step 122, the main CPU decodes the input number read from the diagnostic table in the CPU's RAM and converts, or decodes, this address into a corresponding RAM mailbox address. As shown in the figure, and similar to the case of the initiation signal storage locations in the RAM mailbox, the first two bits 01 indicate that the data is to be read from the input image table of the RAM mailbox, while the third and fourth bits respectively indicate the rack number and module number from which the input signal is received. The last two bits indicate the input bit which is to be tested later in the program as described below.

Following decoding of the input number from the diagnostic table of the CPU's RAM into a corresponding RAM mailbox address, the contents of that location are read from the RAM mailbox at step 123 and the value of an input bit is tested at step 124. If the input bit is 1, this indicates that a confirmation signal has been received and the program branches to step 125 for clearing the start timer flag. The program then at step 126 determines the status of a fault flag. If the fault flags state is 0, indicating that a system fault has not been detected, the program branches up to step 111 for reading the diagnostic table for an output number. If at step 126, it is determined that the fault flag state is 1, the program at step 127 clears the fault from the CRT or other display and returns to step 111 for reading the diagnostic table of the CPU's RAM for an output number.

If at step 124, the input bit is determined to be 0 indicating that a confirmation signal has not been received, the program at step 128 compares the current time with the stored time. The current time is defined as the actual present time to the nearest 1/100ths of a second, while the stored time is defined as the predetermined response time plus the time when an initiating event occurs. If the current time is less than the stored time as determined at step 128, the program returns to the start of the loop at step 111 for reading the diagnostic table of the CPU's RAM for an output number. If at step 128 it is determined that the current time is equal to or greater than the stored time, indicating that the timer has timed out, the program at step 129 causes the main CPU's controller 80 to output an alert signal to the video display 38 as well as to the printer 100 and alpha numeric display 101 for displaying an alarm signal. The program then resets the fault flag to 1 at step 130 and returns to the beginning of the program at step 111 for reading the diagnostic table before an output number for the next machine or machine operation under diagnosis.

Figure 4:
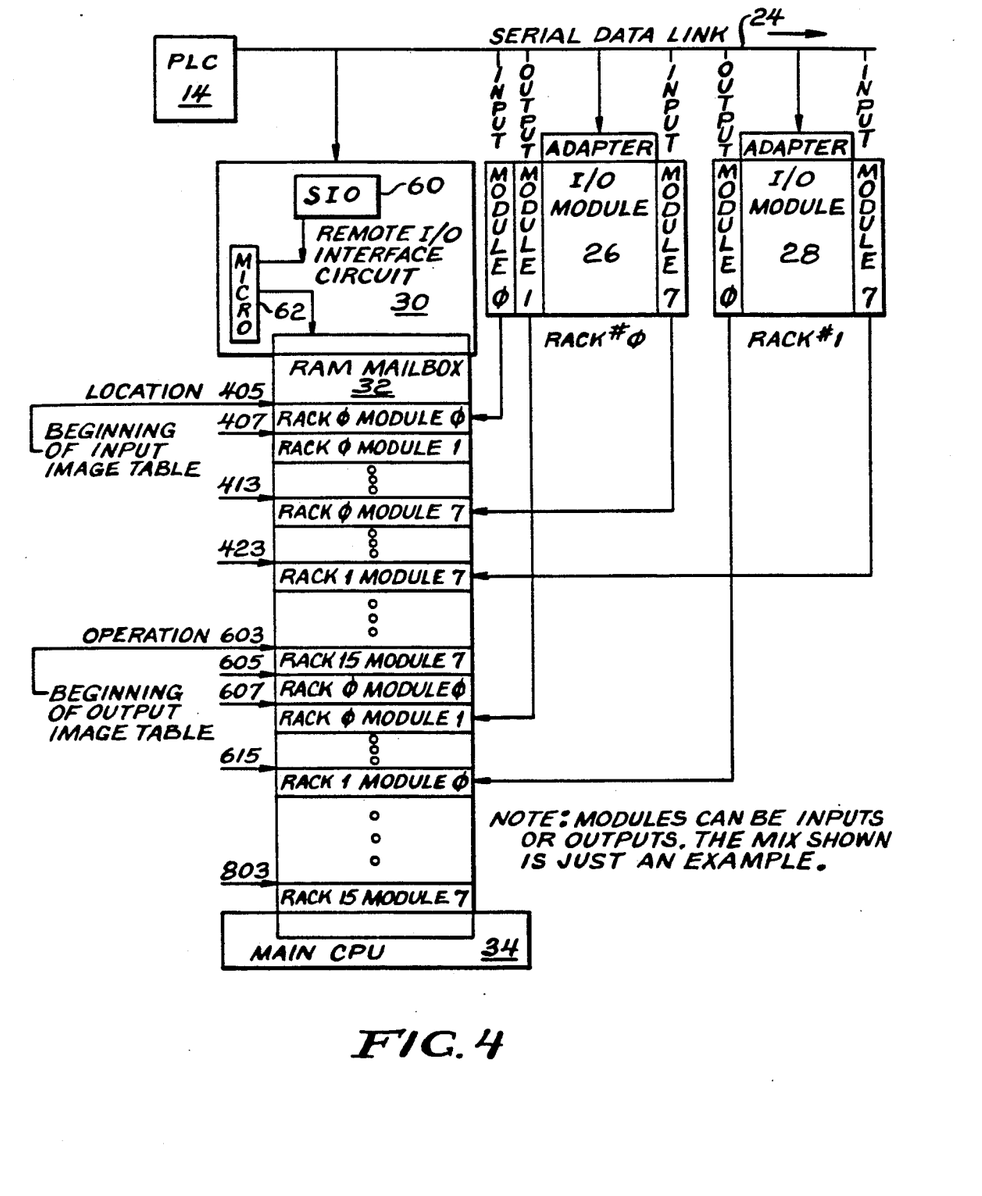
FIG. 4 is a simplified schematic diagram of a portion of the diagnostic system shown in FIG. 1 illustrating additional details of the processing and storage of data therein.

Referring to FIG. 4, there is shown additional details of the interconnections between various portions of the diagnostic system of the present invention. Shown in FIG. 4 are first and second I/O modules 26 and 28 coupled to the PLC 14 via the serial data link 24. The first and second I/O modules 26, 28 are further coupled to the RAM mailbox 32. Coupled between the serial data link 24 and the RAM mailbox 32 is the remote I/O interface circuit 30, while the RAM mailbox 32 is further coupled to the main CPU 34. The RAM mailbox 32 includes a plurality of storage locations which are either in one of two tables. Locations 405–603 comprise the input table for storing initiation signals, or data, output by the PLC 14. Each of the locations in the input table are associated with a respective rack and module of a given I/O module. For example, location designation 405 in the input table stores data relating to rack 0 and module 0 in I/O module 26. Similarly, location 603 in the input table stores data relating to the receipt of an initiation signal by rack 15, module 7 in the second I/O module 28.

The output image table begins at memory location 605 within the RAM mailbox wherein is stored confirmation signal information relating to rack 0, module 0 of the first I/O module 26. The output image table extends to memory location 803 wherein is stored confirmation signal information regarding rack 15, module 7 of the second I/O module 28. Thus, the input image table stores data relating to receipt of a confirmation signal by an I/O module, while the output image table stores data relating to the receipt of an initiation signal by an I/O module. While FIG. 4 shows only two I/O modules 26, 28, each of which includes 15 racks each having 7 modules therein, the present invention is not limited to this number or arrangement of I/O modules and is adapted for use with virtually any number and arrangement of I/O modules.

Referring back to Table II, it can be seen that the Diagnostic Edit File stored in the main CPU's RAM 92 includes a column labelled "COMPL #". This column stores information relating to a complementary function performed by the diagnostic system of the present invention. If the complementary column is blank (no data stored in the COMPL # column), a confirmation event must occur within the specified response time of the machine following detection of an initiation event or a fault will be detected and indicated to a system operator. The fault flag associated with the fault indication will clear if the initiation event goes away or if the confirmation event is detected at a later time following expiration of the response time.

The complementary output function addresses the situation where, following detection of an initiation event and movement of a machine to the desired position, the associated confirmation event is then detected. If the COMP bit is "on", it resets, or unlatches, the latched condition of the initiation event, unless the PLC data table value for the initiation event is still "on". In other words, the presence of a COMP bit in the CPU's RAM turns off the initiation signal unless the PLC continues to output the initiation signal to a machine. If the initiation signal remains "on" when the COMP bit goes "on", because the PLC value is still "on" then the result is similar to a confirmation signal going "on", i.e., the cycle timer stops and is reset. If the COMP bit is turned "off" while the initiation signal is still "on", the timer will start to time again.

The complementary function is useful when the machine under control has an advance position and a return position, such as in the case of a hydraulic cylinder. The initiation signal extends the hydraulic cylinder to the advance position, whereupon the confirmation signal is triggered indicating the desired event has occurred. In many mechanisms, such as hydraulic cylinders, it is desirable to have the mechanism remain in the advance position even when the initiation event is no longer there until the mechanism should be retracted. A COMP bit stored in the PLC 14 clears the timer and tells the mechanism to retract to the return position.

There has thus been shown a diagnostic system for use with a PLC controlled operating system having virtually any number of operating machines which provides real time monitoring and diagnosing of faults in the operating system. The diagnostic system generates an image memory wherein are stored initiation and confirmation signal data for each operation carried out by each machine. An initiation signal starts an operation, while a confirmation signal indicates the operation has been completed. A CPU initiates a timer for determining the interval between receipt of an initiation signal and a confirmation signal. The CPU also compares the time interval between receipt of these two signals with a predetermined response time for each operation of each machine. The response time is defined as the time during which the confirmation signal should be received following receipt of an associated initiation signal, or there is a fault in the system. Upon detection of a fault, the CPU generates an alert signal which is provided to appropriate display devices for providing a system operator with an alarm signal display. The diagnostic system provides real time operating data to the operator for diagnosis in a stand alone system which is independent of and entirely passive with respect to the PLC controlled operating system. The diagnostic system of the present invention can be adapted for operation with virtually any operating system by storing an image of the operation of that system in memory and carrying out the aforementioned diagnostic sequence.

While particular embodiments of the present invention have been shown and described, it will be obvious to those skilled in the art that changes and modifications may be made without departing from the invention in its broader aspects. Therefore, the aim in the appended claims is to cover all such changes and modifications as fall within the true spirit and scope of the invention. The matter set forth in the foregoing description and accompanying drawings is offered by way of illustration only and not as a limitation. The actual scope of the invention is intended to be defined in the following claims when viewed in their proper perspective based on the prior art.

I claim:

1. A system for diagnosing the operation of a machine controlled by a programmable controller via a data transmission link, wherein said programmable controller transmits a plurality of initiation signals to said machine for controlling a respective plurality of operations and said machine generates associated confirmation signals indicating execution by said machine of each of said operations, and wherein each of said operations of said machine is associated with a predetermined response time, said system comprising:

detection and memory circuit means coupled to said data transmission link for generating and storing initiation time signals representative of the absolute times at which associated initiation signals are received and confirmation signals representative of the absolute times at which confirmation signals are received such that said detection and memory circuit means contains an image map of the operation of the system, without generating a reply signal to the programmable controller;

processor means coupled to said detection and memory circuit means for reading said initiation time signals and said confirmation signals from said detection and memory circuit means, wherein said processor means includes:

means for computing an expected time for each event comprising the sum of an initiation time signal and the associated predetermined response time for that event; and means for comparing the expected time and the confirmation time for each event;

control means for generating an alert signal when the confirmation time for an event exceeds the expected time associated with that event; and alarm means coupled to said processor means and responsive to said alert signal for generating an alarm signal for an operator of said machine.

2. The system of claim 1 wherein said detection and memory circuit means includes a random access memory (RAM) having a plurality of storage locations for storing said initiation time signals and said confirmation signals, and signal processing means for directing said initiation time signals and said confirmation signals to designated storage locations in said RAM for each operation of a machine.

3. The system of claim 2 wherein said detection and memory circuit means further includes serial interface circuit means for converting serial data on the data transmission link to parallel data for storage in said RAM.

4. The system of claim 3 wherein said processor means comprises a central processor unit (CPU) including a read only memory (ROM) for storing an operating program for controlling said system.

5. The system of claim 4 wherein said CPU further includes a software timer in said ROM.

6. The system of claim 5 wherein said CPU further includes a second random access memory (RAM) for storing a response time of said machine.

7. The system of claim 6 further comprising means for entering the response time of said machine in said second RAM for storage therein.

8. The system of claim 7 wherein said means for entering the response time of said machine includes a multi-key keyboard coupled to said CPU.

9. The system of claim 8 wherein said keyboard is coupled to and integral with said alarm means.

10. The system of claim 1 wherein said alarm means includes a video display for providing a visual alarm signal for an operator of said machine.

11. The system of claim 10 wherein said video display comprises a cathode ray tube (CRT).

12. The system of claim 10 wherein said video display is an alphanumeric display.

13. The system of claim 1 wherein said machine includes a movable mechanism responsive to an initiation signal and a switch responsive to said moveable mechanism for outputting a confirmation signal following displacement of said moveable mechanism a predetermined distance from an initial position.

14. The system of claim 13 wherein said moveable mechanism is a hydraulic cylinder and said switch is a limit switch responsive to extension of said hydraulic cylinder for outputting a confirmation signal.

15. The system of claim 13 further comprising reset means coupled to said machine for returning said moveable mechanism to said initial position following detection of a confirmation signal.

16. For use with an operating system including a programmable controller coupled by means of a serial data transmission link to a plurality of machines for controlling the operation of said machines, wherein said programmable controller outputs a plurality of initiation signals in a sequential manner to said machines for initiating a sequence of operations by said machines and each machine outputs a confirmation signal to said programmable controller indicating completion of a respective one of said operations, and wherein operation of said machines is characterized by predetermined response times representing the expected time of completion of associated machine operations, a method for diagnosing a fault in the operating system comprising the steps of:

storing in a first memory a plurality of data words representing respective ones of said predetermined response times;

passively monitoring said serial data link to detect initiation signals and for storing in a second memory associated initiation times representing the respective times of occurrence of said initiation signals;

calculating for each initiation signal detected, an expected time comprising the sum of an initiation time and an associated predetermined response time; passively monitoring said serial data link to detect said confirmation signals, and storing in said second memory a confirmation time representing the absolute time at which a confirmation signal is received for each operation, such that said second memory contains an image map of the operation of the system, comparing, for each event, the associated expected time and confirmation time; and generating an alarm to an operator of the system if a confirmation time for an event occurs later than its associated expected time.

* * * * *